March 30, 1926.
E. W. SEEGER
MOTOR CONTROLLER
Filed April 10, 1925
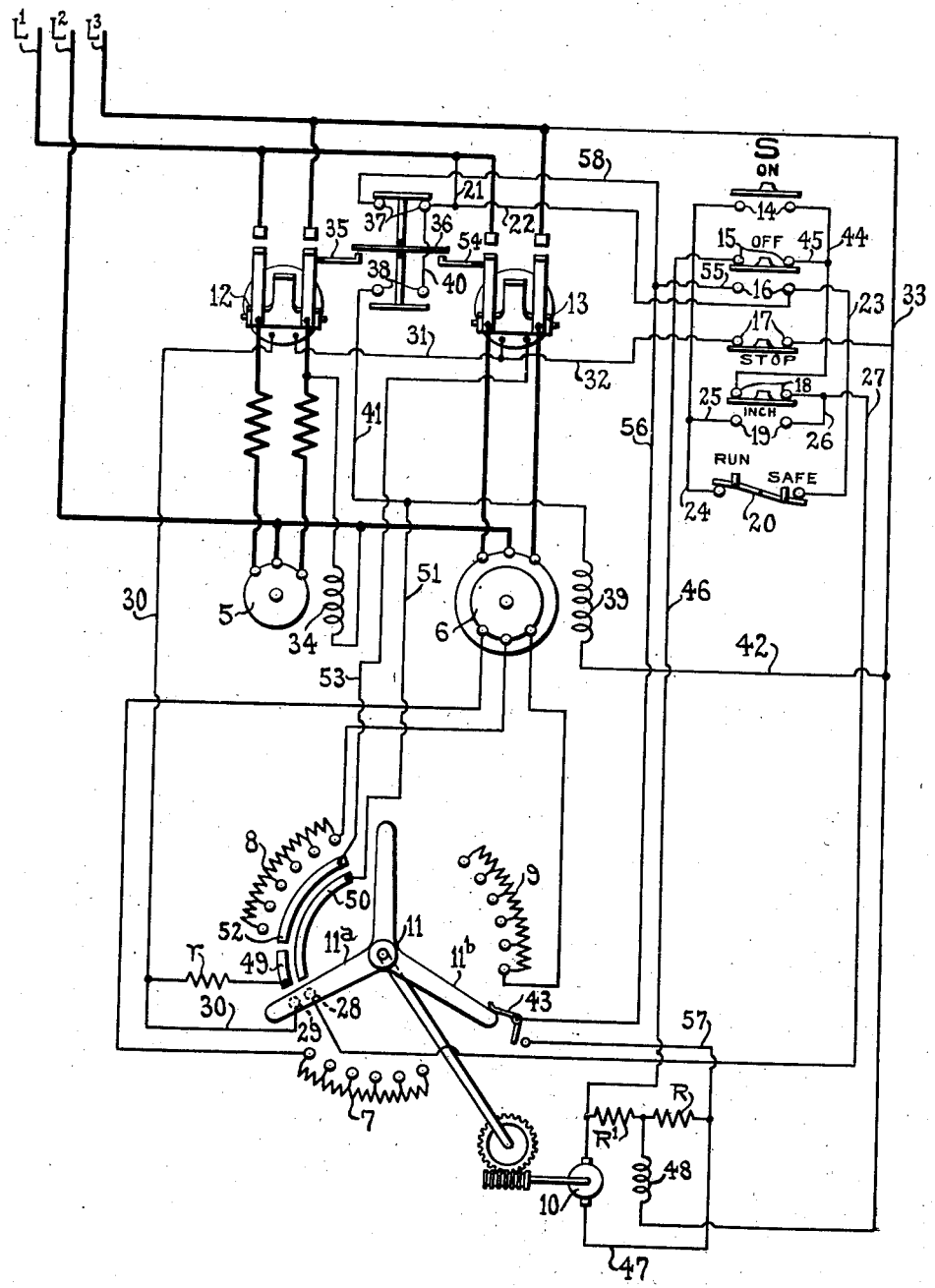
INVENTOR.
Edwin W. Seeger
BY Frank W. Hubbard
ATTORNEY.

Patented Mar. 30, 1926.

1,578,925

UNITED STATES PATENT OFFICE.

EDWIN W. SEEGER, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed April 10, 1925. Serial No. 22,009.

*To all whom it may concern:*

Be it known that I, EDWIN W. SEEGER, a citizen of the United States, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to motor controllers, and more particularly to controllers for two-motor printing presses or press units.

Press units of the character aforementioned ordinarily comprise a small motor operable for inching and starting, a large motor for running, and a pilot motor operable to control both motors and to gradually vary the resistance in circuit with said large motor to bring the latter up to speed.

An object of this invention is to improve and simplify the control instrumentalities for effecting the foregoing operations, among others.

Another object is to provide circuit commutating means eliminating certain electromagnetic relays ordinarily employed in such control systems.

Various other objects and advantages of the invention will hereinafter appear.

The accompanying drawing, consisting of a single figure, illustrates schematically and diagrammatically one embodiment of the invention, but it will be understood that various modifications may be made in the details of construction and mode of operation of the device without departing from the spirit and scope of my invention as defined in the appended claims.

In the drawing the numeral 5 designates a polyphase induction motor of the squirrel cage type to be energized for inching or starting the driven device (not shown), and the numeral 6 designates a polyphase induction motor of the slip-ring type to be energized for running operation of the device, the rotors of said motors being connected by an overrunning clutch in the usual manner. Motors 5 and 6 are shown as supplied with alternating current from a common source indicated by lines $L_1$, $L_2$ and $L_3$.

It will be understood, however, that various other types of alternating current or direct current motors may be employed if desired. The motor 6 is provided with suitable resistance sections 7, 8 and 9 adapted to be included in the secondary circuit thereof and to be gradually excluded from circuit to bring the motor up to speed, a reversible pilot motor 10 being arranged to rotate the triple-arm speed regulating contact element 11 to effect the aforementioned resistance commutation and to return said element to the normal position illustrated. The contact element 11 is adapted to cooperate with certain auxiliary contacts in the path thereof, for purposes hereinafter set forth.

Electroresponsive double-pole switches 12 and 13 are provided for effecting line connection of the motors 5 and 6, respectively, said switches being provided with individual and joint control circuits as hereinafter described.

The manual control means for the system preferably comprises a push button-station S, including an "on" button having normally open down contacts 14; an "off" button having normally closed up contacts 15 and normally open down contacts 16; a "stop" button having normally closed up contacts 17; an "inch" button having normally closed up contacts 18 and normally open down contacts 19; and a switch 20 adapted to be latched in open or closed position, the "safe" button thereof being adapted when depressed to interrupt circuit and the "run" button being adapted when depressed to close said circuit.

The details of construction and arrangement of the various elements will now be described in connection with the operation of the device: Assuming the parts to be in the positions illustrated, the winding of switch 12 may be energized to close the circuit of small motor 5 for inching, by depressing the "inch" button to bridge normally open down contacts 19. The energizing circuit for the winding of switch 12 may then be traced from line $L_1$ by conductors 21, 22 and 23, through switch 20, by conductors 24 and 25 through down contacts 19 of the "inch" button, by conductors 26 and 27 to an auxiliary contact 28 in the path of contact element 11 and through contact arm 11a to an auxiliary contact 29, thence by conductor 30 through the winding of switch 12, by conductors 31 and 32 through the normally closed contacts 17 of the "stop" button, and by conductor 33 to line L₃. Upon closure, switch 12 connects motor 5 with lines L₁ and L₃, said motor being permanently connected with line L₂.

Closure of switch 12 effects energization of brake coil 34, in an obvious manner, for release of the small motor brake (not shown). Carried by the right-hand pole of switch 12, and insulated therefrom, is a member 35 adapted upon closure of switch 12 to raise cross-bar 36 of a vertically movable switch member to thereby interrupt circuit at normally closed contacts 37 and make circuit at normally open contacts 38. Closure of contacts 38 provides an energizing circuit for the large motor brake coil 39, said circuit extending from line L₁ by conductors 21, 22 and 40 through contacts 38, by conductor 41 through said brake coil 39, and by conductors 42 and 33 to line L₃.

As indicated in the drawing the speed regulating contact element 11 is in the extreme off position, wherein the arm 11b thereof engages and opens an off limit switch 43 which is normally biased to closed position, said switch 43 when opened serving to interrupt the energizing circuit for driving the pilot motor in one direction, said circuit being also interrupted by opening of the contacts 37, as aforedescribed. The circuit for driving the pilot motor in the opposite direction is also interrupted at contacts 18 during depression of the "inch" button, and hence the small motor may be started and stopped as often as desired for inching while simultaneously preventing energization of the pilot motor, it being noted that switch 12 under the aforementioned conditions remains closed only so long as the "inch" button is depressed.

Assuming depression of the "on" button to bridge contacts 14, the following operations take place: The switch 12 is closed, thereby starting the small motor 5, the winding of said switch being energized by a circuit extending from line L₁ by conductors 21, 22 and 23, through switch 20, by conductor 24 through the closed contacts 14 of the "on" button, by conductor 44 through the up contacts 18 of the "inch" button, and (as formerly traced) by conductor 27 to contact 28, through contact arm 11a to contact 29, by conductor 30 through the winding of switch 12, by conductors 31 and 32 through closed contacts 17 of the "stop" button, and by conductor 33 to line L₃.

The pilot motor 10 is simultaneously energized for driving the speed regulating contact element 11 in a clockwise direction, the energizing circuit extending from line L₁ to the "on" button as just traced, thence by conductors 44 and 45 through normally closed contacts 15 of the "off" button, by conductor 46 through the armature of pilot motor 10, by conductor 47 through resistance R and the series field 48, and by conductor 33 to line L₃.

Continued rotation of speed-regulating element 11 permits automatic closure of off limit switch 43, thus presetting the latter for reverse operation of pilot motor 10 under certain conditions. Such rotation also effects disengagement of arm 11a from contacts 28 and 29, but not before a maintaining circuit for switch 12 is established through engagement of said arm with contact segments 49 and 50, which circuit may be traced from line L₁ by conductors 21, 22 and 40 through contacts 38 (which are closed due to closure of switch 12 as aforedescribed), thence by conductors 41 and 51 to contact segment 50, through arm 11a to contact segment 49, through resistance r to conductor 30 and thence to line L₃ as previously traced.

It will be noted that an energizing circuit is provided for the pilot motor for driving the speed regulating element 11 in a clockwise direction only so long as the "on" button is depressed, whereas an energizing circuit for switch 12 is automatically maintained when arm 11a is in a position to bridge contact segments 49 and 50, as aforedescribed.

Further rotation of the element 11 effects establishment of an energizing circuit for switch 13 and interruption of the energizing circuit of switch 12, the former circuit extending from line L₁ by conductors 21, 22 and 40 through closed contacts 38, by conductors 41 and 51 to contact segment 50, arm 11a to contact segment 52, by conductor 53 through the winding of switch 13, by conductor 32 through normally closed "stop" contacts 17, and thence by conductor 33 to line L₃. The aforedescribed maintaining circuits are provided independently of the "on" button, and hence the pilot motor 10 may be stopped at any time while contact arm 11a bridges segments 49 and 50 or 52 and 50 without interrupting the energizing circuits of switches 12 and 13, respectively. However, the energizing circuits of either or both of said switches may be interrupted at any time by depressing the "stop" button, as will be obvious.

However, if the "on" button is held closed the element 11 continues to move in a clockwise direction and the sections of resistance 7, 8 and 9 are gradually excluded from the secondary circuit of the large motor 6 to bring the same up to the desired speed. When said speed has been attained the "on" button is released, which discontinues the operation of the pilot motor, without interrupting operation of the large motor 6.

Assuming the large motor 6 to be running at full speed (that is, with all resistance excluded from the secondary circuit thereof) or at any desired intermediate speed, said motor may be brought to rest by depressing the "stop" button to interrupt the energizing circuit of switch 13. Switch 13 is provided with a member 54, similar to the member 35 of switch 12, said member 54 being retracted upon opening of switch 13 to permit opening of contacts 38, thereby deenergizing brake coil 39 and applying the brake.

If a reduction in the speed of motor 6 is desired the "off" button is depressed, thereby providing an energizing circuit for operating the pilot motor 10 in the reverse direction to effect counterclockwise movement of contact element 11 for gradual reinclusion of the sections of resistance 7, 8 and 9 in the secondary circuit. Said energizing circuit may be traced from line $L_1$ by conductors 21 and 22 through the down contacts 16 of the "off" button, by conductors 55 and 56 through the closed contacts of off limit switch 43, by conductors 57 and 47 through the armature of pilot motor 10 in a reverse direction from that aforedescribed, thence through resistance $R_1$ and series field 48, and by conductor 33 to line $L_3$.

Moreover, if the "off" button is held down until arm $11_a$ disengages contact segment 52 the energizing circuit for switch 13 will be broken, whereas reengagement of arm $11_a$ with contact segment 49 will not function to provide a closing circuit for switch 12, due to the presence of the resistance $r$ aforementioned. The contact element may therefore be returned to the position illustrated without effecting reclosure of switch 12.

When the switches 12 and 13 are deenergized with contact element 11 in any position other than that illustrated, said element is automatically returned to the position illustrated, by reverse operation of pilot motor 10, the energizing circuit of the latter extending from line $L_1$ by conductors 21 and 22 through the upper closed contacts 37, by conductors 58 and 56 through the closed contacts of off limit switch 43 and thence through the armature of pilot motor 10 and to line $L_3$ in the manner last traced. The counterclockwise movement of element 11 is automatically continued until arm $11_b$ engages and opens off limit switch 43, which interrupts the energizing circuit of pilot motor 10, thus bringing element 11 to rest in the position indicated on the drawing. By the arrangement aforedescribed the control elements are automatically preset for initiating the starting operation of the device after each stopping operation of either or both of the motors 5 and 6 by the manual control means, or due to failure of voltage, as will be obvious.

What I claim as new and desire to secure by Letters Patent is:

1. In a printing press controller, the combination with a plurality of driving motors, of separate electroresponsive main switches therefor, manually operable switches either of which may be operated to close directly the energizing circuit of one of said main switches, and means controlled by one of said manual switches to close the energizing circuit of the other main switch subject to a delay.

2. In a two-motor printing press controller, the combination with a small motor to be energized for inching and for starting and a large motor to be energized for running, electroresponsive switches adapted when energized to establish power connections for said motors respectively, push button switches normally interrupting the energizing circuit of said small motor switch and each adapted while depressed to establish said circuit for closure of said switch and means independent of one of said push-button switches but responsive to another when depressed for energizing said large motor switch subject to a delay.

3. In a printing press controller, the combination with a plurality of driving motors, of separate electroresponsive main switches therefor, a plurality of push-button switches each adapted upon depression thereof to directly establish an energizing circuit for one of said main switches, and electroresponsive means the energizing circuit of which is also directly established upon depression of one of said push-button switches, said last mentioned means being adapted to automatically establish an energizing circuit for the other of said main switches after a given time interval and to thereafter interrupt the energizing circuit of said first mentioned main switch.

4. In a two-motor printing press controller, the combinataion with a plurality of electroresponsive switches adapted when energized to establish power connections for the motors selectively, a manually operable switch adapted to directly establish an energizing circuit for one of said electroresponsive switches, and associated electroresponsive means also directly controlled by said manually operable switch for automatically establishing an energizing circuit for another of said electroresponsive switches.

5. In a two-motor printing press controller, the combination with a plurality of electroresponsive switches adapted when energized to establish power connections for the motors selectively, a manually operable switch adapted to directly establish an energizing circuit for one of said electroresponsive switches, associated electroresponsive means also directly controlled by said manually operable switch for automatically establishing an energizing circuit for another of said electroresponsive switches, a brake releasing coil for one of the motors, and means adapted upon energization of either of said electroresponsive switches to provide an energizing circuit for said coil.

6. In a two-motor printing press controller, the combination with a pair of electroresponsive switches each adapted when energized to establish power connections for one of the motors respectively, a manually operable switch adapted to directly establish an energizing circuit for one of said electroresponsive switches, associated electroresponsive means the energizing circuit of which is also directly controlled by said manually operable switch for automatically establishing an energizing circuit for the other of said electroresponsive switches, a brake releasing coil, and a switch adapted upon closure of either or both of said electroresponsive switches to provide an energizing circuit for said coil.

7. In a two-motor printing press controller, the combination with a plurality of electroresponsive switches adapted when energized to establish power connections for the motors selectively, a manually operable switch adapted to directly establish an energizing circuit for one of said electroresponsive switches, and associated electroresponsive means also directly controlled by said manually operable switch for automatically establishing an energizing circuit for another of said electroresponsive switches, said last mentioned means also acting to automatically interrupt the energizing circuit of said first mentioned electroresponsive switch.

8. In a two-motor printing press controller, the combination with a plurality of driving motors and individual electroresponsive switches adapted when energized to establish power connections for said motors, a manually operable switch for directly establishing an energizing circuit for one of said electroresponsive switches to start its respective motor, speed regulating resistance for the other motor and a movable member for varying the value of said resistance, a reversible pilot motor for effecting movement of said member, said manually operable switch being also arranged to directly establish an energizing circuit for said pilot motor for movement of said member in one direction, and means associated with said member for automatically establishing an energizing circuit for the other of said electroresponsive switches and for interrupting the energizing circuit of said first mentioned electroresponsive switch.

9. In a two-motor printing press controller, the combination with a plurality of driving motors and individual electroresponsive switches adapted when energized to establish power connections for said motors, a manually operable switch for directly establishing an energizing circuit for one of said electroresponsive switches to start its respective motor, speed regulating resistance for the other motor and a movable member for varying the value of said resistance, a reversible pilot motor for effecting movement of said member, said manually operable switch being also arranged to directly establish an energizing circuit for said pilot motor for movement of said member in one direction, means associated with said member for automatically establishing an energizing circuit for the other of said electroresponsive switches and for interrupting the energizing circuit of said first mentioned electroresponsive switch, and a second manually operable switch for directly interrupting the energizing circuits of either or both of said electroresponsive switches.

10. In a two-motor printing press controller, the combination with a plurality of driving motors and individual electroresponsive switches adapted when energized to establish power connections for said motors, a manually operable switch for directly establishing an energizing circuit for one of said electroresponsive switches to start its respective motor, speed regulating resistance for the other motor and a movable member for varying the value of said resistance, a reversible pilot motor for effecting movement of said member, said manually operable switch being also arranged to directly establish an energizing circuit for said pilot motor for effecting movement of said member in one direction, and means associated with said member for automatically establishing an energizing circuit for the other of said electroresponsive switches and for interrupting the energizing circuit of said first mentioned electroresponsive switch, a second manually operable switch for directly interrupting the energizing circuits of either or both of said electroresponsive switches, and means for thereafter automatically establishing an energizing circuit for operating said pilot motor in a reverse direction to thereby return said movable member to initial position.

11. In a printing press controller, the combination with a plurality of driving motors, of a separate electroresponsive main switch for each of said motors, speed regulating resistance for one of said motors and a movable member for varying the value of said resistance, a pilot motor for effecting movement of said member in reverse directions, a plurality of auxiliary contacts in the path of said member, a manually operable switch adapted when closed with said member in one position to establish an energizing circuit for one of said main switches, said manually operable switch being also adapted to provide an energizing circuit for said pilot motor to move said member in one direction to provide a maintaining circuit for said main switch independently of said manually operable switch and to thereafter establish and maintain an energizing circuit for the other of said main switches, said first mentioned maintaining circuit being interrupted upon given movement of said member unidirectionally, a second manually operable switch adapted when closed to provide an energizing circuit for said pilot motor for movement of said member in a reverse direction to interrupt the energizing circuit of said last mentioned main switch, and associated means for preventing automatic reclosure of said first mentioned main switch during movement of said member to initial position.

In witness whereof, I have hereunto subscribed my name.

EDWIN W. SEEGER.